United States Patent [19]
Vanderstukken et al.

[11] 4,444,825
[45] Apr. 24, 1984

[54] FIRE-SCREENING PANEL

[75] Inventors: Robert Vanderstukken, Ransart; Marcel De Boel, Chatelet, both of Belgium

[73] Assignee: Glaverbel, Brussels, Belgium

[21] Appl. No.: 410,861

[22] Filed: Aug. 23, 1982

[30] Foreign Application Priority Data

Aug. 28, 1981 [GB] United Kingdom ............... 8126343

[51] Int. Cl.$^3$ ............................................. B32B 17/06
[52] U.S. Cl. ..................................... 428/215; 52/232; 52/789; 156/104; 156/106; 156/182; 156/306.6; 156/286; 428/213; 428/428; 428/437; 428/920; 428/921
[58] Field of Search ............... 428/921, 428, 436, 215, 428/920, 38, 34, 213; 52/232, 289; 156/109, 106, 182, 286, 306.6

[56] References Cited

U.S. PATENT DOCUMENTS 3,974,316  8/1976  Jacquemin et al. ............ 428/215
3,997,700 12/1976  Jacquemin et al. ............ 428/332
4,071,649  1/1978  Jacquemin et al. ............ 428/215
4,268,581  5/1981  De Boel .

FOREIGN PATENT DOCUMENTS 1290699  9/1972  United Kingdom .
1368785 10/1974  United Kingdom .
1590837  6/1981  United Kingdom .

*Primary Examiner*—George F. Lesmes
*Assistant Examiner*—E. Rollins Buffalow
*Attorney, Agent, or Firm*—Spencer & Frank

[57] ABSTRACT

A fire-screening glazing panel including a plurality of sheets of vitreous material and at least two spaced layers of intumescent material each sandwiched between sheets of the vitreous material. At least two of the plurality of vitreous sheets are internal vitreous sheets sandwiched between the at least two intumescent layers, and the at least two internal vitreous sheets are laminated together without intervening intumescent material.

34 Claims, 3 Drawing Figures

FIRE-SCREENING PANEL

BACKGROUND OF THE INVENTION

This invention relates to a fire-screening glazing panel comprising spaced layers of intumescent material sandwiched between sheets of vitreous material. The invention also relates to methods of manufacturing such panels.

Such panels can be used in the construction of exterior and interior building walls or partitions. They include transparent panels, useful for example as windows, and also transluscent and opaque panels which can be used in other parts of exterior or interior walls or partitions.

Fire-screening panels can be classified according to their effectiveness assessed in terms of the period of time for which one face of the panel can be exposed to a specified heating schedule, simulating fire, before the opposite face of the panel reaches a specified mean temperature or before any part of that opposite face reaches a certain temperature. One standard test is laid down in International Standard ISO 834 (Fire Resistance Tests—Elements of Building Construction) and a corresponding Belgian Standard NBN 713-020. This test is conducted by mounting the panel in a wall of a furnace in which the temperature is raised according to a specified formula and by measuring the period of time which elapses before any of three conditions occurs, namely (a) the panel ceases to provide a flame-proof and fume-proof barrier, (b) the mean temperature of the face of the panel directed to the exterior of the furnace rises above its initial (ambient) temperature by more than 140° C. and (c) the temperature of any zone on that exterior face increases by more than 180° C.

Various commercially available fire-screening panels comprising an intumescent layer sandwiched between two sheets of glass are able to survive that test for about 20 minutes. If glass fibre and wire mesh is added to the intumescent layer, the panels will survive the test for longer times.

In British patent specification No. 1 290 699 (BASF) it is proposed to provide a fire-screening panel comprising three sheets of glass secured to intervening intumescent layers. Those intumescent layers are able to form primary and secondary heat barriers in the event of the outbreak of fire on one side of the panel. It was found that the effectiveness of such a panel as a fire screen tends to increase with the thickness of the central glass sheet. This is in part because a thicker sheet is better able to prevent non-uniform heating of the secondary barrier-forming intumescent layer which is located behind that sheet. In our U.S. patent application Ser. No. 06/368,623 filed Apr. 15, 1982, such fire-screening panels are described wherein the central vitreous sheet is thicker than the outer sheets and has a thickness of at least 6 mm. Such a panel can have, for a given panel weight, a very high performance assessed by a fire-screening test such as that above referred to. If the outer sheets are identical, and the different intumescent layers are likewise identical, the panel is equally effective whichever of its faces is directed towards the fire.

SUMMARY OF THE INVENTION

The present invention also involves use of at least two intumescent layers, each sandwiched between vitreous sheets, but it departs from previous vitreous fire-screening panel constructions having those features, by incorporating a pair of internal vitreous sheets secured together without intervening intumescent material. Prima facie the bonding together of a pair of vitreous sheets without intervening intumescent material must involve a manufacturing complication without compensating benefit, but in fact considerable advantages are afforded. The repetitive production of panels meeting certain fire-screening criteria is actually simplified, as is also the industrial production of fire-screening panels of a range of different sizes subject to changing market demands. These advantages are exploited in production methods which form part of this invention.

According to the present invention there is provided a fire-screening glazing panel comprising at least two spaced layers of intumescent material each sandwiched between sheets of vitreous material, characterised in that there are at least two said intumescent layers between which there are internal vitreous sheets which are laminated together without intervening intumescent material.

One advantage of the invention is that it creates new options in the manufacturing process. For example, if the intumescent material to be incorporated in the panel is initially applied to vitreous sheets before assembly thereof to form the panel, which is a particularly satisfactory procedure, the total quantity of intumescent material can be applied to the vitreous sheets so that each sheet is coated on one side only. On assembly, each intumescent layer in the panel becomes formed by two such coatings. In general, it is easier to form an intumescent layer of a certain thickness by combining thinner coatings applied to different sheets than to form the entire layer thickness on one sheet. The advantage is particularly apparent when forming thick intumescent layers, e.g. layers having a thickness of at least 0.8 mm. If a single vitreous sheet were to be used in place of the aforesaid interior sheets, it would be necessary in order to achieve this advantage to apply a coating of intumescent material to each side of that single sheet and that is not nearly so easy to do under mass production conditions.

A further advantage of the invention is that it opens the way to a new production procedure according to which the panel is assembled by combining two preformed thinner panels each comprising an intumescent layer sandwiched between two vitreous sheets. By laminating a vitreous sheet of one of the thinner panels to a vitreous sheet of the other thinner panel, those laminated sheets become internal sheets of a panel according to the invention. The said thinner panels can be panels cut from a panel or panels of the same composition but of larger area. It is much easier to cut such thinner panels than it would be to cut a thicker panel formed by bonding them together.

A further advantage of the invention is that because of the presence of laminated vitreous sheets between two intumescent layers, a substantial heat-absorbing capacity effective for reducing disparities in the heat transfer to different regions of the intumescent layer which is further from the fire, can be provided without having to use a notably thick vitreous sheet. The individual internal laminated sheets can e.g. be of thickness suitable for the most common glazing purposes.

In certain embodiments of the invention the internal laminated vitreous sheets are bonded together by means of intervening plastics material, e.g. polyvinylbutyral, which can be used as a pre-formed film or films. Alternatively polyurethane or polyvinylchloride can be used. Instead of using a plastics material, an adhesive composition can be used. The use of a plastics layer is advantageous inter alia because it gives the panel improved resistance to mechanical shock.

There may be two or more internal laminated virtreous sheets.

Preferably the aggregate thickness of the internal laminated vitreous sheets is at least 6 mm. This condition is desirable for substantially attenuating temperature gradients and promoting a uniform temperature within the area of the internal sheets.

Preferably the aggregate thickness of the internal laminated vitreous sheets is greater than at least one of the outer panel sheets. In the event that a panel according to the invention is exposed to fire on one side thereof, the thickness of the vitreous sheet which is furthest from the fire is not a factor of major importance for the fire-screening effectiveness of the panel. At least one of the outer sheets of the panel can therefore be a relatively thin sheet, for example of a common glazing sheet thickness, so that it does not make the panel unnecessarily heavy. Preferably each of the outer sheets of the panel is thinner than the combined thicknesses of the internal laminated sheets. If the sheet nearest the fire breaks fairly soon under the combined effects of thermal shock and forces exerted by the adjacent layer of expanding intumescent material, the panel can still serve as a very effective fire screen, provided the internal vitreous sheets, on account of their combined thickness, can remove temperature gradients quickly enough to prevent the occurrence of objectionable hot spots on the remote face of the panel. The polyvinylbutyral or other bonding layer(s) between the internal sheets can also contribute to the attenuation of temperature gradients, as already mentioned. The use of outer sheet one or each of which is thinner than the combined thicknesses of the internal sheets is therefore compatible with a high performance rating of the panel and is favourable for restricting the overall weight of the panel. Preferably at least one of the outer panel sheets has a thickness in the range 4.0 to 2.0 mm.

In preferred embodiments of the invention, the outer panel sheets are of the same thickness. This feature is of advantage because both outer sheets can be cut from the same flat glass stock. Moreover, if the intumescent layers are identical in composition and thickness, as is preferred, the panel is then wholly symmetrical and is equally effective whichever side thereof is exposed to fire.

It is advantageous for the outer and internal vitreous sheets of the panel to be of the same thickness. This means that if each of the said sheets is regarded as of one unit thickness, the combined thickness of the internal sheets is x units, where x is the number of internal laminated sheets. The use of vitreous sheets all of the same thickness is very beneficial to the panel manufacturer both for component standardisation reasons and because it simplifies automation of component handling and assembly operations. However, compensating advantages can be realised by incorporating a relatively thick vitreous sheet between the intumescent layers. The advantages include a greater fire resistance. If such a relatively thick sheet is provided as the middle one of three internal laminated sheets this advantage can be realised while still realising the advantage that the panel can be formed by laminating together two similar preformed thinner panels each comprising a sandwiched intumescent layer. In certain panels according to the invention there is a said middle sheet having a thickness of at least 6 mm.

Very good fire-resisting properties can be promoted by making each intumescent layer at least 1.2 mm in thickness. Most preferably the aggregate thickness of the intumescent layers is at least 3.5 mm. The aggregate thickness of the intumescent layers influences the period of time for which the panel can withstand exposure to fire before it ceases to satisfy certain test conditions as hereinbefore specified.

Preferred intumescent material comprises hydrated alkali metal salts. Examples of alkali metal salts which can be used in hydrated form are: potassium aluminate, potassium plumbate, sodium stannate, potassium stannate, sodium aluminium sulphate and aluminium phosphate, potassium aluminium sulphate, sodium borate, potassium borate and sodium orthophosphates. Such substances have very good properties for the purposes in view. They are in many cases capable of forming transparent layers which adhere well to vitreous material.

Hydrated alkali metal silicates, for example sodium silicate, are especially suitable for forming the intumescent layers. It is especially suitable for the intumescent layers to be layers of hydrated sodium silicate in which the weight ratio $SiO_2$: $Na_2O$ is 3.1:1 or 3.4:1 and containing 30 to 35% by weight of water.

The layers of intumescent material can be formed by using an aqueous solution of the intumescent material, which can be applied to form layers on the vitreous panel sheets or on temporary supports preparatory to transfer to such panel sheets, and then dried until the water content has the required value. Such layers can subsequently be caused to bond together the vitreous sheets between which they are sandwiched, e.g. by subjecting such layers to heat and/or pressure.

The intumescent layers can alternatively be formed by or from an intumescent material wholly or partly in granular form, with or without a binder. This has the advantage that the necessity for a drying step can be avoided or the drying time can be reduced. If a binder is used, it is preferably water or an aqueous solution of the intumescent material. Material incorporated in granular or partly granular form can also be caused to bond together the vitreous sheets between which it is sandwiched, e.g. by subjecting such material to heat and/or pressure.

Useful information concerning the formation of intumescent layers from solutions of intumescent material or from intumescent material in granular form with or without a binder and useful information concerning substances for protectively coating vitreous sheets to avoid spoiling thereof by contact with intumescent material, is contained in United Kingdom specification No. 1,590,837 and in the specification of U.S. Pat. No. 4,268,581 granted on May 19, 1981, which specifications are incorporated herein as reference.

The entire panel is preferably constituted as a laminate. This means that it is preferable for the outer vitreous sheets to be laminated to internal vitreous sheets by the intumescent layers. It is however within the scope of the invention for the outer vitreous sheets to be held in spaced relation to inner sheets in some other way, e.g. by a frame. In the latter case the intervening intumescent material need not bond the said outer and inner sheets together. The intumescent layers can for example be layers of intumescent grains.

In order to reduce the likelihood of vitreous sheets cracking or fragmenting under thermal shock, it is preferable for the material of at least one of the vitreous sheets, particularly at least one of the internal sheets, to have a coefficient (E) of expansion in the temperature range 0° to 400° C. of at most $7.5 \times 10^{-6}$ per °C. Furthermore it is advantageous for the material of at least one sheet to have a dilatometric softening point of at least 600° C. The dilatometric softening point is the temperature (called the 11.5 temperature) at which the vitreous material has a viscosity of $10^{11.5}$ poises. Any vitreous sheet of material which satisfies this further condition, is reasonably resistant to collapse immediately following the occurrence of cracks in the sheet. A said thermal expansion and/or softening property or properties is (are) preferably possessed by at least one of the internal laminated vitreous sheets. The said properties are particularly beneficial for a relatively thick internal sheet e.g. a sheet of at least 6 mm in thickness, which may constitute one of the internal laminated sheets, e.g. the middle one of three internal sheets, of a panel according to the invention.

The above specified expansion and softening criteria can be met by forming the sheet or sheets in question from a borosilicate glass, a vitro-ceramic or vitro-crystalline material, or an alumino-silicate or alumino-borosilicate glass. These are the preferred categories of vitreous material. Examples of compositions of an alumino-silicate and three alumino-boro-silicate glasses which have been found satisfactory are as follows (% by weight):

| | | | | |
|---|---|---|---|---|
| $SiO_2$ | 62.8 | 69.5 | 73.25 | 70 |
| $Al_2O_3$ | 8.4 | 4.0 | 6.2 | 10 |
| $B_2O_3$ | 1.1 | 8.7 | 7.2 | 8 |
| $Na_2O$ | 11.7 | 9.3 | 8.1 | 8 |
| BaO | 2.4 | 5.5 | — | — |
| CaO | — | 3.0 | 3.4 | 3 |
| MgO | 4.4 | — | 1.7 | 1 |
| ZnO | 8.2 | — | — | — |
| $TiO_2$ | 0.6 | — | — | — |
| $As_2O_3$ | 0.4 | — | 0.15 | — |
| 11.5T (°C.) | 607 | 607 | 618 | 623 |
| Ex $10^{-6}$ (°C.$^{-1}$) | 7.25 | 6.39 | 5.3 | 5.34 |

In some preferred embodiments of the invention, one or more sheets of the panel, preferably including at least one of the internal laminated sheets, is of tempered glass, especially chemically tempered glass. This affords advantages when the panel is to be used in situations where the resistance to breakage of the panel prior to the outbreak of fire is of particular importance.

In a panel according to the invention there can be more than one vitreous sheet and/or more than one intumescent layer on one or each side of the internal laminated vitreous sheets. For example, on one or each side of such internal sheets there may be two spaced vitreous sheets and two intumescent layers, one of such layers being sandwiched between those two sheets and the other of them being sandwiched between one of those sheets and the internal laminate.

This invention also includes methods of manufacturing a fire-screening panel according to the invention as hereinbefore defined. A first method according to the invention comprises the steps of forming thinner panels each comprising an intumescent layer sandwiched between two vitreous sheets and subsequently bonding such thinner panels together by laminating exposed vitreous sheet thereof so that those laminated sheets become interior sheets of the resulting thicker panel.

This method is very convenient in the volume production of fire-screening panels. The thinner panels which are eventually combined to form the final product can be stored for a period of time before being used as components for making the thicker product. If thinner panels of three or more different specifications are produced, e.g. thinner panels which differ inter se in respect of the thickness of at least one of their constituent vitreous sheets or in respect of the thickness of their intumescent layers, then different combinations of thinner panels can be selected for forming final products of different characteristics. A more important advantage, if the thinner panels are laminates, is that they can be relatively easily cut to a required size, e.g., by scoring the vitreous sheets and breaking the panels along the scored lines. For cutting the final product, resort to sawing would probably be necessary.

The thinner panels are preferably laminated together by means of one or more plastics inter-layers such as a film or films of polyvinylbutyral. Alternatively a suitable adhesive composition can be employed. Said thinner panels can be laminated directly together e.g. by means of a single said plastics sheet. Alternatively they can be laminated together indirectly e.g. they can be laminated to opposite sides of an intervening vitreous sheet by means of two such plastics sheets.

The said first method according to the invention can be performed by first forming a pair of panel components each in the form of a sub-laminate comprising vitreous sheets laminated together with an intervening intumescent layer, and subsequently laminating these panel components together to form a laminated fire-screening panel.

When bonding vitreous sheets together by an intervening layer of intumescent material, it is advantageous to subject the sandwich, comprising the vitreous sheets and the intervening layer of intumescent material, to heat and pressure conditions, including temporary sub-atmospheric pressure conditions, such that the space between the vitreous sheets is subjected to suction forces acting at the periphery of the assembly before the assembly is subjected to pressure causing firm bonding of the vitreous sheets together by means of the intumescent layer. Such a procedure enables a good inter-sheet bond to be more easily and reliably obtained because or partly because of the removal of air and in some cases excess water and/or solvent from between the vitreous sheets prior to firm bonding thereof. Preferably the procedure used comprises two stages in the first of which (hereafter called "preliminary bonding stage") the inter-sheet space is aspirated as above mentioned and the intumescent material is caused to adhere to the sheets but without reaching the final bond strength, and in the second of which (hereafter called "firm bonding stage") the sandwich is heated to a higher temperature and/or subjected to a higher pressure to achieve the required firm bonding. The sandwich is not at any time heated to such an extent that, at the prevailing pressure, the intumescent material becomes tumid. Such a procedure can be employed in cases where the material of the intumescent layer is wholly or partly in granular form prior to the bonding procedure, as well as in cases wherein such intumescent layer has been formed by drying a solution of intumescent material.

The bonding of vitreous sheets by means of an intumescent layer by a method involving a preliminary bonding stage as above referred to is described in United Kingdom specification No. 1,590,837 and in U.S. Pat. No. 4,268,581 hereinbefore referred to, and suitable temperature and pressure schedules for the preliminary bonding stage are described in each specification with reference to FIG. 2 of the drawings thereof.

The formation of a complete fire-screening panel by laminating together two pre-formed panel components, each comprising an intumescent layer sandwiched between vitreous sheets, can also be effected by a two-stage bonding procedure of the kind above described, aspiration of the bonding layer space or spaces between the sublaminates being effected during the first stage. The bonding of vitreous sheets by means of a thermoplastics material, using such a precedure, is described in United Kingdom patent specification No. 1,368,785 which is also incorporated herein as reference.

When carrying out a said first method according to the invention the various bonding steps can be carried out in different sequences. In one embodiment of such first method, the sheets of the individual panel components are firmly bonded together by the respective intumescent layers and the resulting laminates are subsequently bonded together to form the final panel, e.g. using a two-stage bonding procedure with edge suction during the preliminary stage as above described.

In a second embodiment of said first method, the vitreous sheets of each of the individual panel components are bonded by means of the intervening intumescent layer by a preliminary bonding stage as above referred to, (e.g. a preliminary bonding stage as described in United Kingdom patent specification No. 1,590,837 or in U.S. Pat. No. 4,268,581 these panel components are then laminated together by means of one or more thermoplastics or adhesive layers by a preliminary bonding stage as above referred to, (e.g. a preliminary bonding stage as described in United Kingdom Pat. No. 1,368,785), and the resulting laminate is then subjected to final bonding conditions of temperature and pressure to cause simultaneous firm bonding of the panel component sheets by means of the intumescent layers and firm bonding of such components by means of the intervening thermoplastics or adhesive layer(s). Such final bonding conditions may e.g. comprise heating of the laminate to a temperature of 135° C. while the laminate is brought under superatmospheric pressure e.g. a pressure of 13 kg/cm2.

A second method according to the invention comprises the steps of assembling all the constituent sheets and layers which are to form the panel and subjecting the entire assembly to bonding conditions to cause the internal sheets, between the intumescent layers, to become laminated together and to cause the outer sheets to become bonded to such internal laminate by the intumescent layers. In carrying out this second method the bonding of the sheets is preferably effected by a two-stage procedure comprising preliminary and firm bonding stages, with aspiration in the first stage of the intumescent layer spaces and of the bonding medium space or spaces between the internal sheets. It is in general terms suitable in said first stage to expose the assembly of sheets and layers, in a chamber in which the assembly is heated, to an environmental pressure which is reduced to less than 200 mm Hg, and preferably to 20 to 70 mm Hg; to reduce the pressure in the sealing ring, which is in sealed communication with the periphery of the assembly, to less than 20 mm Hg; and subsequently to increase the environmental pressure and the pressure in the sealing ring so that the environmental pressure reaches atmospheric just before the temperature of the assembly reaches 55° C. and the pressure in the peripheral sealing ring reaches atmospheric before the temperature of the assembly reaches 85° C. and preferably before such temperature reaches 80° C. if polyvinylbutyral is used, as is preferred, as bonding medium between the internal sheets. In the second stage, i.e. the firm bonding stage, in which the laminate resulting from the preliminary bonding stage is subjected to firm bonding conditions, the said laminate may e.g. be heated to a temperature of 135° C. while the laminate is brought under a pressure of 13 kg/cm2.

Panels according to the invention and having any one or more of the various advantageous optional features hereinbefore described can be produced by means of a said method according to the invention.

Advantageously, when using any of the manufacturing methods above defined, one or each intumescent layer sandwiched between two vitreous sheets is formed by coating one side of each of those two sheets with intumescent material and subsequently assembling those sheets so that such coatings are brought together and they together form the intumescent layer ready for the bonding operation. Preferably each of the intumescent layers is formed by combining two coatings in that manner.

This method of forming intumescent layers of the required thickness is of particular benefit in the volume production of fire-screening panels and facilitates automated or partly automated assembly. This is because it is not necessary for an intumescent layer of the final thickness required in the panel to be formed by coating one surface. Moreover, because there is more than one vitreous sheet between the intumescent layers, the formation of each of the intumescent layers by two coatings as above described does not necessitate precoating of both faces of a vitreous sheet with intumescent material. The coating of both faces of a sheet with intumescent material involves problems if good quality uniform coatings are to be formed because it is difficult to handle the sheet during or after coating so that neither of the coatings becomes impaired.

In a method as just described of building up intumescent layers of a given thickness, it is preferable for the intumescent coatings on the coated vitreous sheets to be of the same thickness because this condition enables all of the coatings to be formed by a single standardised technique.

It is particularly beneficial to employ a panel production method wherein two thinner panels are produced and then combined as hereinbefore referred to and wherein each of the thinner panels is formed by coating one face of each of the two constituent vitreous sheets with intumescent material and then securing the coated sheets together with their intumescent coatings in contact.

The vitreous sheets used in carrying out the present invention, or any of such sheets, can be sheets of glass or of a vitro-ceramic or vitro-crystalline material. The constituent sheets of a given panel can be of different vitreous materials. Preferably all of the sheets are of glass. Preferable one or more of the vitreous sheets and most preferably at least the internal vitreous sheets are formed from a boro-silicate glass, a vitro-ceramic or vitro-crystalline material, or an alumino-silicate or alumino-boro-silicate glass.

BRIEF DESCRIPTION OF THE DRAWING

Certain embodiments of the invention will now be described by way of example with reference to the accompanying drawings.

DESCRIPTION OF THE PREFERRED EMBODIMENTS

Figure 1:
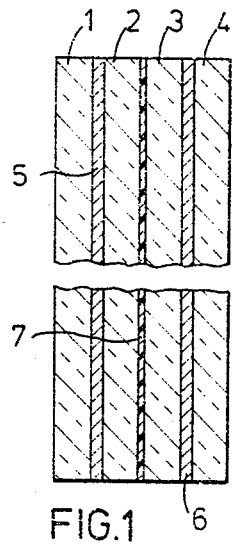
FIG. 1 is a cross-section of a fire screening panel according to a first embodiment of the invention.

The panel shown in FIG. 1 comprises four vitreous sheets 1, 2, 3, 4 each having a thickness of 3 mm, and two layers 5, 6 of intumescent material each having a thickness of 3.6 mm. The vitreous sheets 2 and 3 have been bonded together by means of a film 7 of polyvinylbutyral which latter may e.g. have a thickness of 0.38 mm. The panel is entirely symmetrical about this bonding layer. If, after installing the panel for use, fire breaks out on one side of the panel which is of sufficient intensity to break the panel, the outer panel sheet 1 or 4 which is nearer the fire will break first under the combined effect of thermal shock and the forces exerted by the expansion of the intumescent material in the adjacent (primary) intumescent layer. The nearer of the two interior vitreous sheets will be the next to break. Meanwhile the temperature of the other outer vitreous sheet, which is furthest from the fire, will rise. The time which elapses before the mean temperature of the exposed face of that outer sheet or the temperature of any zone within that face reaches a given level is influenced by the combined thicknesses of the vitreous sheets 2 and 3, and also to some extent by the plastics layer 7 itself. Of course at a certain stage this plastics layer will soften and be destroyed, but during the earlier stages of the exposure of the panel to the fire, the plastics layer does assist to some extent in promoting a uniform heating of the secondary intumescent layer and of the vitreous sheet which is furthest from the fire.

A panel as described with reference to FIG. 1 and incorporating hydrated sodium silicate with a weight ratio $SiO_2$: $Na_2O$ of 3.3:1 or 3.4:1 and 30 to 35% weight of water as the intumescent material, when subjected to the International Standard ISO 834 test was found to survive that test for more than 60 minutes. The vitreous sheets of this panel were untempered sheets of ordinary soda-lime glass.

In a modified version of the panel described with reference to FIG. 1, tempered glass sheets were used in the manufacture of the panel.

In another modified version of the panel described with reference to FIG. 1, the layers 5, 6 of intumescent material each had a thickness of 1.5 mm. This panel, when subjected to the said International Standard test was found to survive that test for more than 30 minutes.

Figure 2:
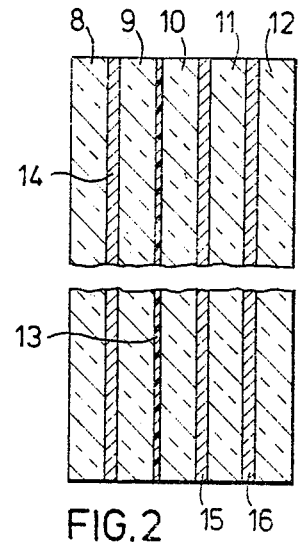
FIG. 2 is a cross-section of a fire screening panel according to a second embodiment of the invention.

The panel shown in FIG. 2 comprises five vitreous sheets 8–12 each having a thickness of 3 mm. The glass sheets 9 and 10 are laminated together by an intervening bonding layer 13 formed from a film of polyvinylbutyral 0.38 mm in thickness. This internal laminate is bonded to outer glass sheets 8 and 11 by intervening layers 14, 15 of hydrated sodium silicate as used in the panel of FIG. 1, such layers each having a thickness of 1.8 mm. The glass sheet 11 is bonded to outermost glass sheet 12 by a further layer 16 of hydrated sodium silicate. This third intumescent layer is of the same composition as layers 14 and 15 and likewise has a thickness of 1.8 mm. When this panel was subjected to the International Standard test above referred to with the fire on what in FIG. 2 is the lefthand side of the panel, the panel survived the test for more than 30 minutes. The temperature of the right-hand exposed face of the panel reached 180° above its initial ambient temperature in 52 minutes.

Figure 3:
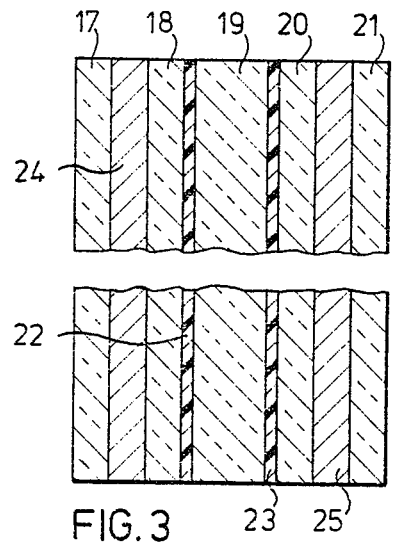
FIG. 3 is a cross-section of a fire screening panel according to a third embodiment of the invention.

The panel shown in FIG. 3 comprises five glass sheets 17–21. Each of sheets 17, 18, 20 and 21 is 3 mm in thickness. Glass sheet 19 is 8 mm in thickness. The glass sheets 18, 19 and 20 are laminated together by bonding layers 22, 23 each formed from a film of polyvinylbutyral 0.38 mm in thickness. The internal laminate comprising the glass sheets 18, 19 and 20 is laminated to outer glass sheets 17 and 21 by intumescent layers 24, 25. Each of those layers is composed of hydrated sodium silicate of the same composition as that used in the panels of FIGS. 1 and 2, but has a thickness of 3.6 mm. When this panel was subjected to the International Standard test above referred to, the panel survived the test for more than 90 minutes.

We claim:

1. A fire-screening glazing panel comprising a plurality of sheets of vitreous material and at least two spaced layers of intumescent material each sandwiched between sheets of said vitreous material, with at least two of said plurality of vitreous sheets being internal vitreous sheets sandwiched between said at least two intumescent layers, said at least two internal vitreous sheets being laminated together without intervening intumescent material.

2. A panel according to claim 1, wherein said at least two internal laminated vitreous sheets are bonded together by means of intervening polyvinylbutyral or other plastics material.

3. A panel according to claim 1, wherein the aggregate thickness of said at least two internal laminated vitreous sheets is at least 6 mm.

4. A panel according to claim 1, wherein said panel includes outer panel sheets each comprising one of said plurality of sheets of vitreous material and the aggregate thickness of said at least two internal laminated vitreous sheets is greater than at least one of said outer panel sheets.

5. A panel according to claim 1, wherein said panel includes other panel sheets each comprising one of said plurality of sheets of vitreous material and at least one of said outer panel sheets has a thickness in the range 4.0 to 2.0 mm.

6. A panel according to claim 1, wherein said panel includes outer panel sheets each comprising one of said plurality of sheets of vitreous material and said outer panel sheets are of the same thickness.

7. A panel according to claim 1, wherein all of said vitreous sheets are of the same thickness.

8. A panel according to claim 1, wherein there are three said internal laminated vitreous sheets, the middle one of those three being thicker than each of the other two.

9. A panel according to claim 8, wherein said middle sheet has a thickness of at least 6 mm.

10. A panel according to claim 1, wherein each said intumescent layer is at least 1.2 mm in thickness.

11. A panel according to claim 1, wherein the aggregate thickness of said intumescent layers is at least 3.5 mm.

12. A panel according to claim 1, wherein all of said vitreous sheets are laminated together.

13. A panel according to claim 1, wherein at least one of said vitreous sheets has a coefficient of thermal expansion in the temperature range 0° to 400° C. of at most $7.5 \times 10^{-6}$ per °C.

14. A panel according to claim 13, wherein said at least one of said vitreous sheets is one of said internal laminated vitreous sheets.

15. A panel according to to claim 1, wherein at least one of said vitreous sheets has a dilatometric softening point of at least 600° C.

16. A panel according to claim 15, wherein said at least one of said vitreous sheets is one of said internal laminated vitreous sheets.

17. A panel according to claim 1, wherein at least one of said vitreous sheets is formed from a boro-silicate glass, a vitro-ceramic or vitro-cyrstalline material, or an alumino-silicate or alumino-boro-silicate glass.

18. A panel according to claim 1, wherein at least one of said vitreous sheets is a tempered glass sheet.

19. A panel according to claim 1 wherein at least one said layer of intumescent material is constituted by two coatings each on a respective one of said sheets of vitreous material between which said at least one layer is sandwiched.

20. A method of manufacturing a fire-screening glazing panel, said method comprising: forming first panels each including an intumescent layer sandwiched between two vitreous sheets and bonding the first panels together to form a second panel, said bonding step including assembling and laminating together, without intervening intumescent material, exposed vitreous sheets of the first panels so that the laminated vitreous sheets become interior sheets of the resulting second panel.

21. A method according to claim 20, wherein said bonding step includes bonding the first panels together by means of at least one plastics inter-layer.

22. A method according to claim 21, wherein said at least one inter-layer is polyvinylbutyral.

23. A method according to claim 20, wherein said forming step includes laminating together the vitreous sheets of each first panel by means of the at least one intervening intumescent layer.

24. A method according to claim 23, wherein laminating of the vitreous sheets of each first panel is effected by subjecting such vitreous sheets and the intervening intumescent layer to heat and pressure conditions, including temporary sub-atmospheric pressure conditions, such that the space betwen the vitreous sheets is subjected to suction forces acting at the periphery of the sheets before the sheets are subjected to a final pressure causing firm bonding of the vitreous sheets together by means of the at least one intumescent layer.

25. A method according to claim 24, wherein said subjecting step includes subjecting the vitreous sheets and intumescent layer of each first panel to a first two-stage bonding procedure, the first stage of which is a preliminary bonding stage and includes aspirating the space between the vitreous sheets for causing the intumescent layer to adhere to the sheets but without reaching the final bond strength, and the second stage of which is a firm bonding stage and includes heating the first panel to a higher temperature and subjecting it to a higher pressure sufficient to achieve firm bonding.

26. A method according to claim 25, wherein said first two-stage bonding procedure of the vitreous sheets and intumescent layer of each first panel is performed entirely before said step of bonding the first panels together to form the second panel.

27. A method according to claim 25, wherein the preliminary bonding stage of said first two-stage bonding procedure is performed prior to said bonding step, said assembling step includes assembling together the exposed vitreous sheets of the first panels with an intervening bonding medium and said firm bonding stage of said first two-stage bonding procedure is performed after said assembling step.

28. A method according to claim 27, wherein said step of laminating together exposed vitreous sheets of the first panels includes a second two-stage bonding procedure the first stage of which includes aspirating the space between the first panels and causing the bonding medium to adhere to the exposed vitreous sheets between which it is sandwiched, and the second stage of which includes subjecting the exposed vitreous sheets and intervening bonding medium to conditions bringing about firm bonding.

29. A method according to claim 28, wherein the second stage of said second two-stage bonding procedure also constitutes the second stage of said first two-stage bonding procedure.

30. A method according to claim 20, wherein said forming step includes forming at least one first panel by coating one side of each of the two vitreous sheets in such first panel with intumescent material and subsequently assembling those sheets so that such coatings are brought together and they together form the intumescent layer sandwiched between two vitreous layers.

31. A method according to claim 20, wherein said assembling step includes assembling together the exposed vitreous sheets of the first panels with an intervening bonding medium, and said step of laminating together exposed vitreous sheets of the first panels includes a two-stage bonding procedure the first stage of which includes aspirating the space between the first panels and causing the bonding medium to adhere to the exposed vitreous sheets between which it is sandwiched, and the second stage of which includes subjecting the exposed vitreous sheets and intervening bonding medium to conditions bringing about firm bonding.

32. A method of manufacturing a fire screening glazing panel, wherein the panel includes a plurality of sheets of vitreous material, and at least two spaced apart layers of intumescent material each sandwiched between sheets of the vitreous material, with at least two of said plurality of vitreous sheets being internal vitreous sheets sandwiched between the at least two intumescent layers, the internal vitreous sheets being laminated together without intervening intumescent material, said method comprising: assembling all the sheets and layers of the panel without any preliminary laminating steps and then subjecting the entire assembly to bonding conditions to laminate all the vitreous sheets together.

33. A method according to claim 32, wherein the assembly further includes an intervening bonding medium disposed between the internal laminated vitreous sheets, and said subjecting step includes a two-stage procedure including preliminary and firm bonding stages, the preliminary bonding stage including aspirating the spaces between the intumescent layers, internal sheets and bonding medium.

34. A method according to claim 32, including forming at least one said intumescent layer sandwiched between two vitreous sheets by coating one side of each of said two vitreous sheets with intumescent material and subsequently assembling said two vitreous sheets so that such coatings are brought together to form said at least one intumescent layer.

* * * * *